United States Patent [19]
Prissadachky

[11] Patent Number: 6,039,235
[45] Date of Patent: Mar. 21, 2000

[54] PIPE ALIGNER HAVING FLEXIBLE LINKAGES

[76] Inventor: Radoslav Prissadachky, 1301 46th Ave. N., St. Petersburg, Fla. 33703

[21] Appl. No.: 09/087,060

[22] Filed: May 29, 1998

[51] Int. Cl.[7] .............................. B23K 37/00; B23K 1/18; B23K 5/22
[52] U.S. Cl. ...................... 228/44.5; 228/49.3; 228/212
[58] Field of Search ................................... 228/212, 44.5, 228/49.3

[56] References Cited

U.S. PATENT DOCUMENTS

| | | | |
|---|---|---|---|
| 2,376,765 | 5/1945 | Forbes | 228/5.1 |
| 4,016,637 | 4/1977 | Swensen | 29/281.4 |

*Primary Examiner*—Patrick Ryan
*Assistant Examiner*—Zidia Pittman
*Attorney, Agent, or Firm*—Smith & Hopen, P.A.; Ronald E. Smith

[57] ABSTRACT

A tool for aligning a pair of pipes in abutting, axial alignment with one another includes a pair of pipe-contacting members disposed on opposite sides of the pipes in diametrically opposed relation to one another. The pipe-contacting members are interconnected to one another by a pair of fastening members disposed on opposite sides of the pipes. Each pipe-contacting member includes a pair of cylindrical members that are disposed in parallel relation to a common longitudinal axis of the pipes. The cylindrical members of each pipe-contacting member are interconnected to one another by a pair of flexible links that conform to the outer circumference of the pipes due to their flexibility. The opposite ends of each flexible link are pivotally secured to their associated cylindrical members so that removing a pair of pipes from the tool after completion of a welding procedure, or introduction of a pair of pipes into the tool for welding, requires that only one fastening member be disengaged. In a second embodiment, three or more of the pipe-contacting members are arranged in circumferential relation to one another in surrounding relation to the pipes to be welded.

6 Claims, 3 Drawing Sheets

PIPE ALIGNER HAVING FLEXIBLE LINKAGES

BACKGROUND OF THE INVENTION

1. Field of the Invention

This invention relates, generally, to tools for holding pipes in axial alignment with one another so that they may be welded together. More particularly, it relates to such a tool that is easy to open after use so that another set of pipes can be welded together without completely disassembling the tool.

2. Description of the Prior Art

Tools for holding a pair of pipes in abutting, axial alignment with one another typically require that the tool be taken apart at the end of a welding procedure so that two more pipes can be held by the tool. The need to take the tool apart between welding jobs reduces the efficiency of the welding procedure. What is needed, then, is a tool that need not be completely taken apart at the conclusion of a welding procedure.

The tools heretofore known are also limited to the extent that they work well with one size of pipes but cannot be easily adapted to work with pipes of widely varying diameters. Thus there is a need for a pipe aligner that can easily handle pipes of differing diameters.

However, in view of the art considered as a whole at the time the present invention was made, it was not obvious to those of ordinary skill in this art how the needed improvements could be provided.

SUMMARY OF THE INVENTION

The long-standing but heretofore unfulfilled need for an apparatus that overcomes the limitations of the prior art is now met by a new, useful, and nonobvious invention. The novel pipe aligner includes a first pipe-contacting means adapted to engage a pair of abutting pipes that are in axial alignment with one another. The first pipe-contacting means includes a pair of pipe-abutting members that are disposed in parallel relation to a common longitudinal axis of the pipes and in parallel relation to one another.

A pair of spaced apart flexible link members are disposed in interconnecting relation to each pipe-abutting member of the pair of pipe-abutting members at opposite ends thereof. Each flexible link member of said pair of flexible link members has its respective opposite ends pivotally engaged to their associated pipe-abutting members.

A second pipe-contacting means is adapted to engage a pair of abutting pipes that are in axial alignment with one another; said second pipe-contacting means has a common structure with the first pipe-contacting means.

The second pipe-contacting means is adapted to be disposed in diametric opposition to the first pipe-contacting means to position the abutting pipes in sandwiched relation between the first and second pipe-contacting means.

A pair of releasable fastening means are provided for releasably interconnecting opposed pipe-abutting members of the first and second pipe-contacting means to one another. In this way, disengagement of a first releasable fastening means of the pair of fastening means enables pivotal movement of the first pipe-contacting means with respect to the second pipe-contacting means so that a first pair of pipes sandwiched between the first and second pipe-contacting means is removable from the sandwiched engagement and a second pair of pipes is introduceable into the sandwiched engagement in the absence of a need to disengage a second releasable fastening means of said pair of fastening means.

In a preferred embodiment, the pipe-abutting members are cylinder members so that each of them abuts the pipes along a line of contact that is parallel to said longitudinal axis. However, depending upon the size of the pipe, in some cases the cylinder members will not contact the pipes.

A pair of circumferentially-extending slots are formed in each respective cylinder member near its opposite ends, and a pivot pin is disposed within each of the respective cylinder members at opposite ends of each respective cylinder member.

The opposite ends of the respective flexible link members pivotally engage an associated pivot pin by extending through an associated circumferentially-extending slot to enable said pivotal movement of said first pipe-contacting means relative to said second pipe-contacting means.

In a second embodiment, three pipe-contacting means are arranged about the periphery of the abutting pipes. This arrangement has utility when pipes of relatively large diameter are to be welded together; the third pipe-contacting means has a common structure with said first and second pipe-contacting means. The first, second and third pipe-contacting means are disposed in circumferential relation to one another to position the abutting pipes in surrounded relation between the first, second and third pipe-contacting means. A first, second and third releasable fastening means are provided for releasably interconnecting circumferentially-adjacent pipe-abutting members of the first, second and third pipe-contacting means to one another. Accordingly, disengagement of any one of the first, second and third releasable fastening means enables pivotal movement of two of the pipe-contacting means with respect to one another so that a first pair of pipes surrounded by the first, second and third pipe-contacting means is removable from said surrounded engagement and a second pair of pipes is introduceable into said surrounded engagement in the absence of a need to disengage a second releasable fastening means of the first, second and third fastening means.

It is a primary object of this invention to provide a pipe aligner having an easy opening means to facilitate the pipe welding process.

Another object is to provide a versatile tool that works with pipes of widely varying diameters.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
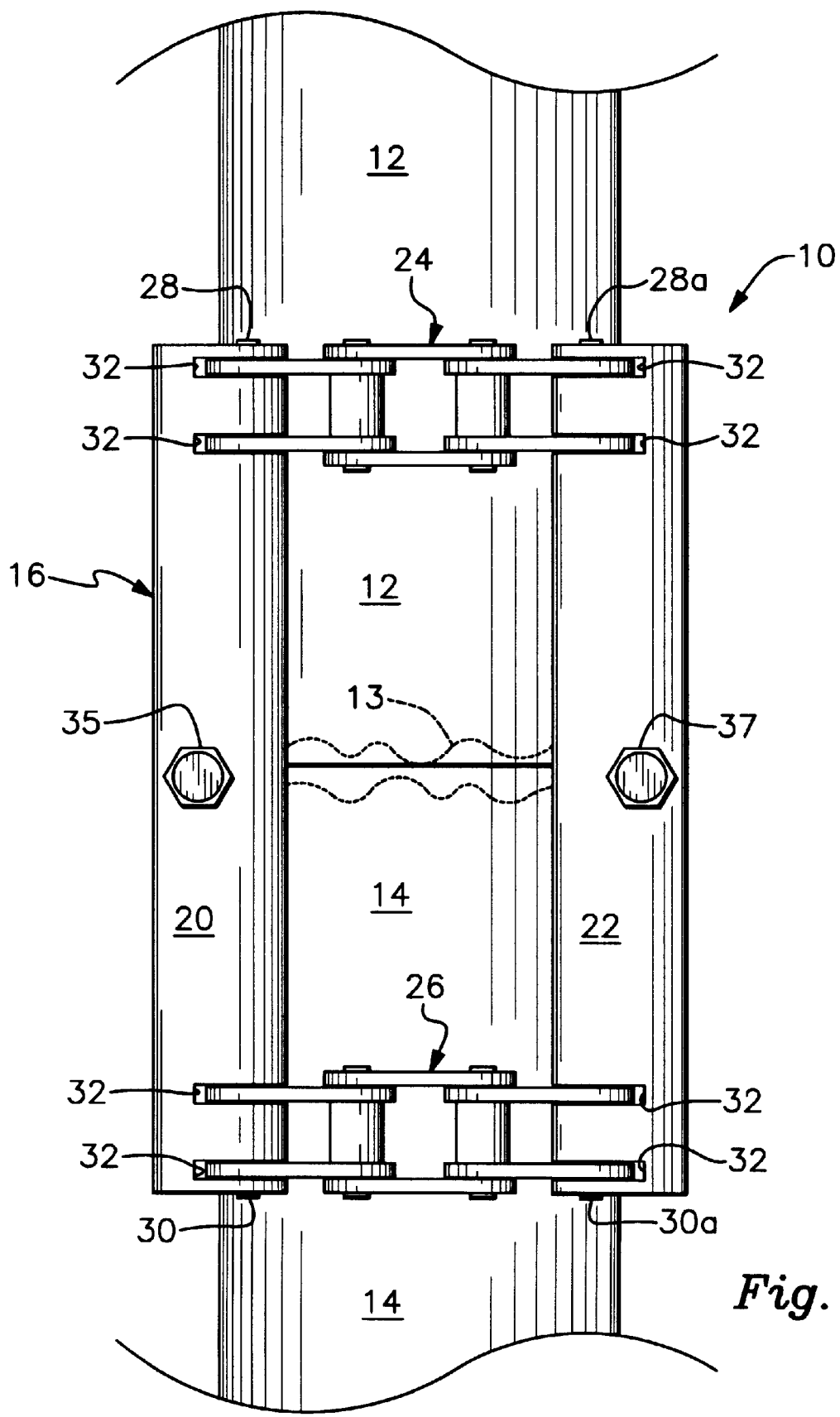
FIG. 1 is an elevational view of a first embodiment of the invention.
Figure 2:
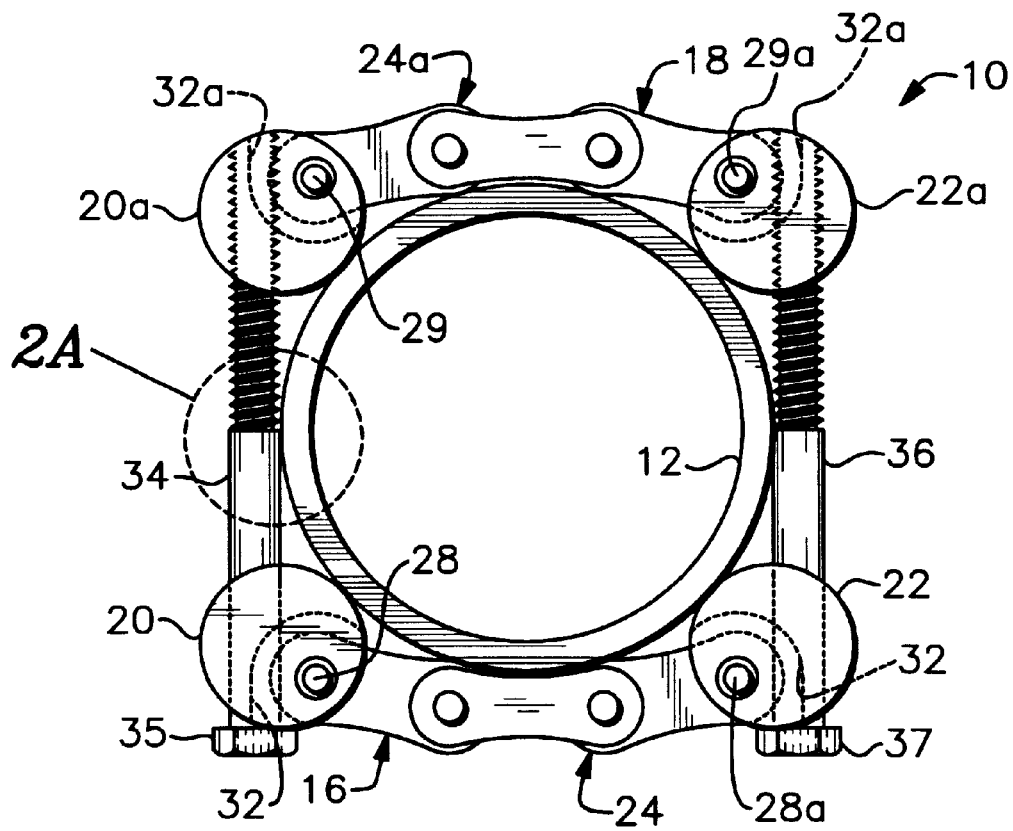
FIG. 2 is a plan view thereof.

Referring now to FIGS. 1 and 2, it will there be seen that an exemplary embodiment of the invention is denoted as a whole by the reference numeral 10.

Pipe aligner 10 firmly secures pipes 12 and 14 in abutting axial alignment with one another. Reference numeral 13 denotes a weld.

In this first embodiment, as best understood in connection with FIG. 2, tool 10 includes two diametrically opposed pipe-contacting means; each is denoted 16, 18 as a whole. Pipe-contacting means 16 includes a pair of cylinders 20, 22 that are circumferentially spaced apart from one another when disposed in surrounding or capturing relation to pipes 12, 14. Cylinders 20, 22 are interconnected to one another at their respective opposite ends by a pair of spaced apart flexible linkages denoted 24, 26. The extent of said flexible linkages determines the amount of spacing between said cylinders. The respective opposite ends of flexible linkages 24, 26 are pivotally secured to cylinders 20, 22 by pivot pins denoted 28, 28a, and 30, 30a. A plurality of slots, collectively denoted 32, are formed in each cylinder 20, 22 near its opposite ends to allow pivotal movement of said opposite ends of said flexible linkages 24, 26.

It should be noted that flexible linkages 24, 26 need not be provided in the form of a sprocket chain; said linkages may take many forms, as long as they are flexible and made of a material that is substantially nonstretchable so as to maintain the abutting pipes (or shafts) in concentric relation to one another throughout the welding process.

Moreover, members 20, 22 need not be of cylindrical cross-section but may have a cross-section of any predetermined geometrical configuration, including hexagonal and the like. The important role of aligning the pipes (the invention also has utility in aligning shafts, rods, etc. and is not limited to use with pipes) is played by flexible linkages 24, 26, and not by the cylinder members. Said cylinder members merely provide the means for holding the opposite ends of said flexible linkages. In some applications, members 20, 22 may not even contact the pipes, but in such cases the flexible linkages still perform their function without loss of effectiveness.

Pipe-contacting means 18, which is diametrically opposed to pipe contacting means 16 in this first embodiment as aforesaid, has the same construction of said pipe-contacting means 16. Accordingly, the cylinders of pipe-contacting means 18 are denoted 20a, 22a, the pair of vertically spaced apart flexible linkages that interconnect cylinders 20a, 22a are denoted 24a, 26a (not shown), the pivot pins that secure the opposite ends of said flexible linkages 24a, 26a to cylinders 20a, 22a are denoted 29, 29a, and the slots that permit pivotal movement of said opposite ends with respect to said pivot pins are collectively denoted 32a.

Figure 2A:
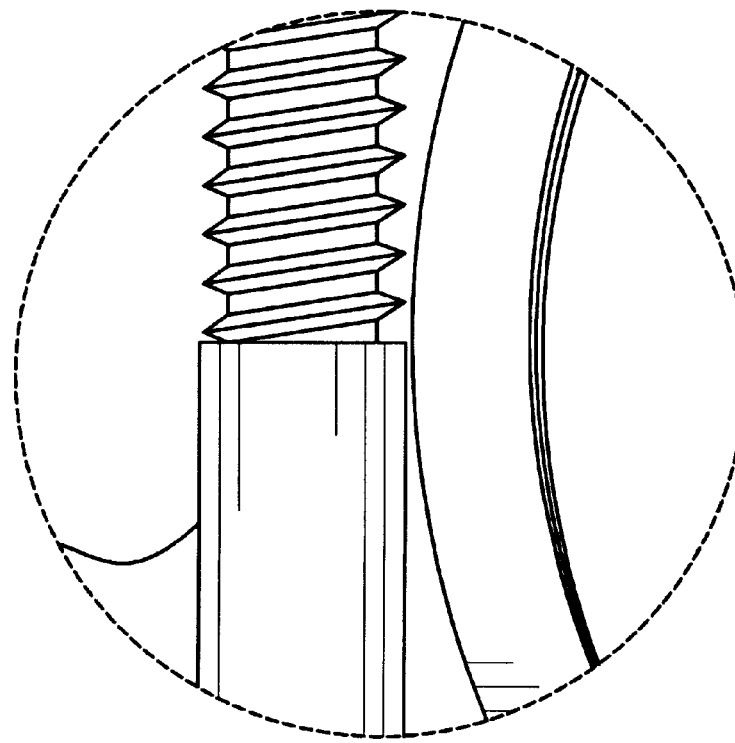
FIG. 2A is an enlarged view of the encircled area denoted 2A in FIG. 2.

Pipe-contacting means 16 and 18 are interconnected to one another by elongate bolts 34, 36. Said bolts have tool-engageable heads 35, 37, respectively, and their opposite ends are screw-threaded as depicted. Cylinders 20a and 22a may be provided with internal threads as depicted or nuts may be employed to engage the respective free ends of said bolts. As best seen in FIG. 2A, bolts 34, 36 do not contact pipes 12 or 14, there being a clearance therebetween. In actual practice, the clearance is larger than the clearance depicted.

It will now be understood that to remove from tool 10 a pair of abutting pipes that have been successfully welded together while held in axial alignment with one another as depicted in FIG. 1 requires disengagement of only one bolt 34 or 36 from cylinder 20a or 22a. When the selected bolt has been disengaged, tool 10 is swung open; this allows removal of the welded pipes and introduction of two more pipes to be welded to one another. Re-engagement of the disengaged bolt is accomplished easily, and the process is repeated easily at the end of each successful welding procedure.

Figure 3:
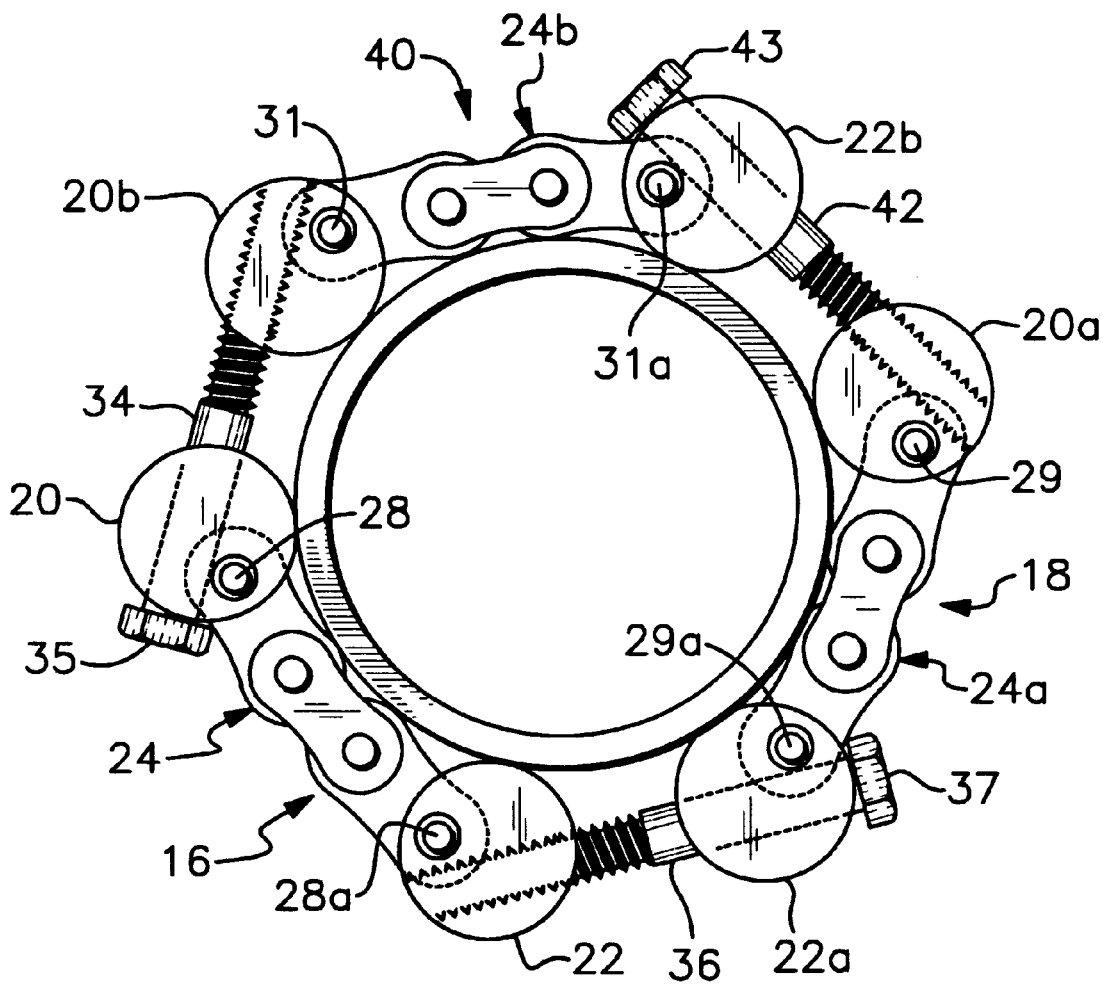
FIG. 3 is a plan view of a second embodiment.

The plan view of FIG. 3 discloses an alternative embodiment where a third pipe-connecting means 40 is employed. This embodiment has utility for pipes having a relatively large diameter. Its parts are the same as that of pipe-connecting means 16 and 18 and are therefor denoted with similar reference numerals. More particularly, the cylinders in this embodiment are denoted 20b, 22b, the pivot pins that can be seen are denoted 31, 31a, the flexible linkage is denoted 24b, and the elongate screw that interconnects cylinders 20a and 22b is denoted 42; it has tool-engageable head 43. Note how the respective tool-engageable heads 35, 37 and 43 are arrayed; this arrangement allows any one of the three screws to be disengaged from its associated cylinder to enable removal of welded pipes and introduction of two unwelded pipes. Thus, as in the first embodiment, the novel tool need not be completely disassembled when a job is done and a new job begun, as in prior art pipe holders.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A pipe aligner, comprising:

a first pipe-contacting means adapted to engage a pair of abutting pipes that are in axial alignment with one another;

said first pipe-contacting means including a pair of pipe-abutting members that are disposed in parallel relation to a common longitudinal axis of said pipes and in parallel relation to one another;

a pair of spaced apart flexible link members disposed in interconnecting relation to each pipe-abutting member of said pair of pipe-abutting members at opposite ends thereof;

each flexible link member of said pair of flexible link members having its respective opposite ends pivotally engaged to its associated pipe-abutting members;

a second pipe-contacting means adapted to engage a pair of abutting pipes that are in axial alignment with one another, said second pipe-contacting means having a common structure with said first pipe-contacting means;

said second pipe-contacting means adapted to be disposed in diametrically opposed relation to said first pipe-contacting means to position said abutting pipes in sandwiched relation between said first and second pipe-contacting means;

a pair of releasable fastening means for releasably interconnecting opposed pipe-abutting members of said first and second pipe-contacting means to one another;

each of said releasable fastening means being provided in the form of an elongate bolt that extends between two opposed pipe-abutting members and which screw-threadedly engages one of them so that tightening of said elongate bolt increases a pipe-aligning force created by pulling said diametrically-opposed pipe-contacting means toward one another;

whereby removal of either of said elongate bolts enables pivotal movement of said first pipe-contacting means with respect to said second pipe-contacting means so that a first pair of pipes sandwiched between said first and second pipe-contacting means is removable from said sandwiched engagement and a second pair of pipes is introducible into said sandwiched engagement in the absence of a need to disengage a second elongate bolt of said pair of elongate bolts.

2. The pipe-aligner of claim 1, wherein said pipe-abutting members are cylinder members so that each of them abuts said pipes along a line of contact that is parallel to said longitudinal axis in applications where said cylinder members abut said pipes.

3. The pipe aligner of claim 2, further comprising:

a pair of circumferentially-extending slots formed in each respective cylinder member near its opposite ends;

a pivot pin disposed within each of said respective cylinder members at opposite ends of each respective cylinder member;

said opposite ends of said respective flexible link members pivotally engaging an associated pivot pin by extending through an associated circumferentially-extending slot to enable said pivotal movement of said first pipe-contacting means relative to said second pipe-contacting means.

4. A pipe aligner, comprising:

a first pipe-contacting means adapted to engage a pair of abutting pipes that are in axial alignment with one another;

said first pipe-contacting means including a pair of pipe-abutting members that are disposed in parallel relation to a common longitudinal axis of said pipes and in parallel relation to one another;

a pair of spaced apart flexible link members disposed in interconnecting relation to each pipe-abutting member of said pair of pipe-abutting members;

each flexible link member of said pair of flexible link members having its respective opposite ends pivotally engaged to their associated pipe-abutting members;

a second pipe-contacting means adapted to engage a pair of abutting pipes that are in axial alignment with one another, said second pipe-contacting means having a common structure with said first pipe-contacting means;

a third pipe-contacting means adapted to engage a pair of abutting pipes that are in axial alignment with one another, said third pipe-contacting means having a common structure with said first and second pipe-contacting means;

said first, second and third pipe-contacting means adapted to be disposed in circumferential relation to one another to position said abutting pipes in surrounded relation between said first, second and third pipe-contacting means; and a first, second and third releasable fastening means for releasably interconnecting circumferentially-adjacent pipe-abutting members of said first, second and third pipe-contacting means to one another;

each of said first, second and third releasable fastening means being provided in the form of an elongate bolt that extends between said circumferentially-adjacent pipe-abutting members and which screw-threadedly engages one of them so that tightening of said elongate bolt increases a pipe-aligning force created by pulling said circumferentially-adjacent pipe-contacting means toward one another;

whereby disengagement of any one of said first, second and third elongate bolts enables pivotal movement of two of said pipe-contacting means with respect to one another so that a first pair of pipes surrounded by said first, second and third pipe-contacting means is removable from said surrounded engagement and a second pair of pipes is introducible into said surrounded engagement in the absence of a need to disengage a second elongate bolt of said first, second and third elongate bolts.

5. The pipe aligner of claim 4, wherein said pipe-abutting members are cylinder members so that each of them abuts said pipes along a line of contact that is parallel to said longitudinal axis in applications where said cylinder members abut said pipes.

6. The pipe-aligner of claim 5, further comprising:

a pair of circumferentially-extending slots formed in each respective cylinder member near its opposite ends;

a pivot pin disposed within each of said respective cylinder members at opposite ends of each respective cylinder member;

said opposite ends of said respective flexible link members pivotally engaging an associated pivot pin by extending through an associated circumferentially-extending slot to enable said pivotal movement of said first pipe-contacting means relative to said second pipe-contacting means.

* * * * *